US012634275B2

(12) United States Patent (10) Patent No.: US 12,634,275 B2
Rahn et al. (45) Date of Patent: May 19, 2026

(54) APPLICATION PROGRAMMING INTERFACE FOR ACCESS TO OWNERSHIP VOUCHERS

(71) Applicant: Arista Networks, Inc., Santa Clara, CA (US)

(72) Inventors: Ethan B Rahn, Agoura Hills, CA (US); Aman Mangal, Jaipur (IN); Steve Ulrich, Minneapolis, MN (US); Prateek Nigam, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 108 days.

(21) Appl. No.: 18/475,005

(22) Filed: Sep. 26, 2023

(65) Prior Publication Data

US 2025/0106198 A1 Mar. 27, 2025

(51) Int. Cl.
*H04L 9/40* (2022.01)
*G06Q 10/0631* (2023.01)
*G06Q 10/067* (2023.01)

(52) U.S. Cl.
CPC ..... *H04L 63/0823* (2013.01); *G06Q 10/0631* (2013.01); *G06Q 10/067* (2013.01)

(58) Field of Classification Search
None
See application file for complete search history.

(56) References Cited

U.S. PATENT DOCUMENTS 11,611,590 B1 * 3/2023 Amar ................... G06Q 10/105
2009/0177688 A1 * 7/2009 Karlsen .................. G06Q 10/06
2024/0372865 A1 * 11/2024 Aggarwal ............. H04L 67/143

* cited by examiner

*Primary Examiner* — Shirley X Zhang
(74) *Attorney, Agent, or Firm* — Fountainhead Law Group, PC

(57) ABSTRACT

An organization tree comprises nodes which represent different groups within an organization. The nodes are associated with users and devices in the organization. When a user requests an ownership voucher to install a device, the request is validated before an ownership voucher is generated. The validation includes at least verifying that the node the user is associated with is either the same node as the node of the device or is an ancestor node of the device.

18 Claims, 5 Drawing Sheets ownership voucher, 200

```
202   "created-on": "2023-08-01T13:45:31.64429485+05:30",

204   "expires-on": "2023-08-05T13:45:31.+05:30",

206   "serial -number": "JPEadefh27",

208   "assertion": "verified",

210   "pinned-domain-cert":

[BASE-64 ENCODED TEXT ]

212   "domain-cert-revocation-checks": true

214   "bootstrap server": 110.192.128.10
```

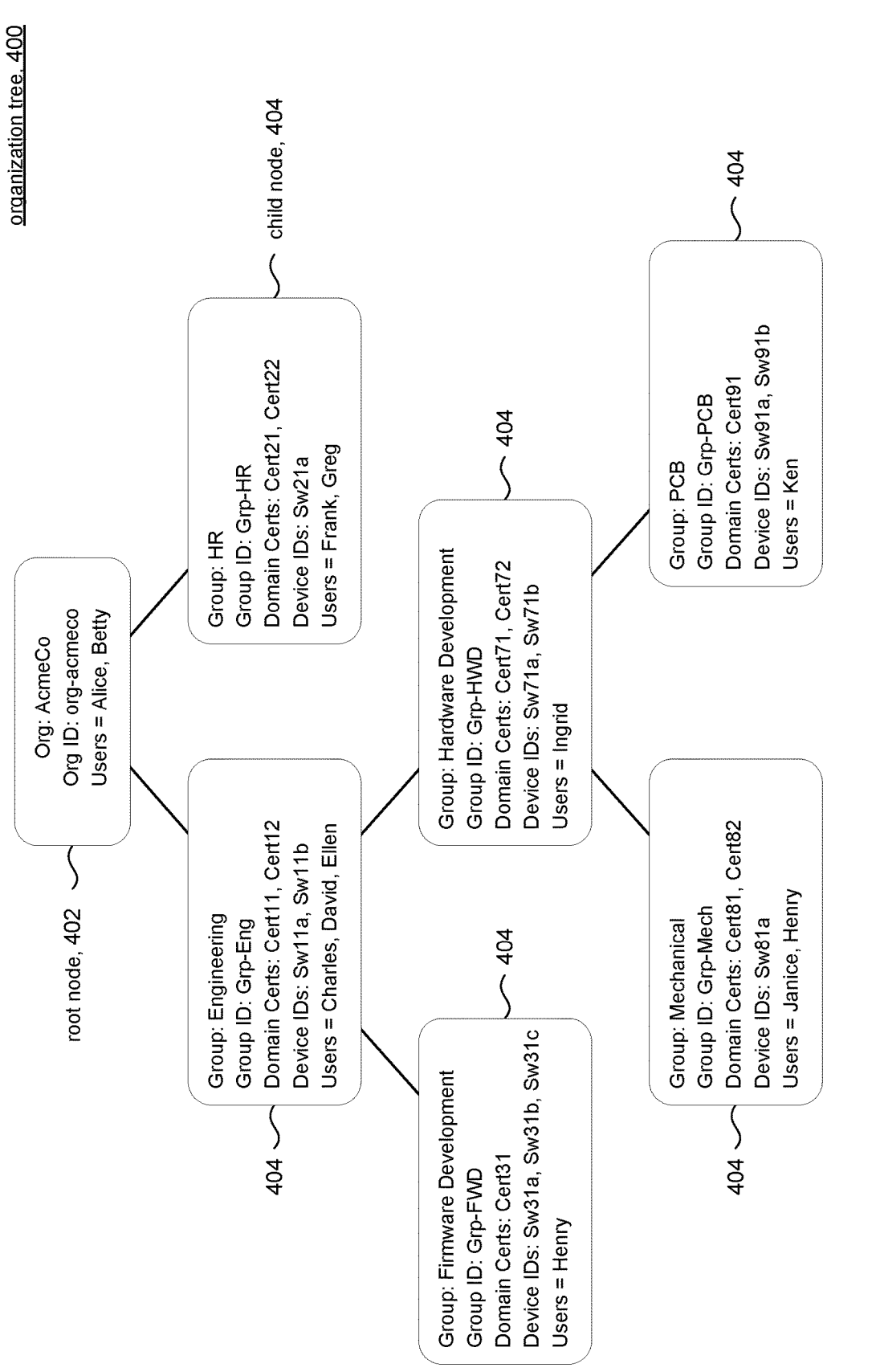

organization tree, 400 root node, 402

Org: AcmeCo
Org ID: org-acmeco
Users = Alice, Betty child node, 404

Group: HR
Group ID: Grp-HR
Domain Certs: Cert21, Cert22
Device IDs: Sw21a
Users = Frank, Greg Group: Engineering
Group ID: Grp-Eng
Domain Certs: Cert11, Cert12
Device IDs: Sw11a, Sw11b
Users = Charles, David, Ellen

404

Group: Hardware Development
Group ID: Grp-HWD
Domain Certs: Cert71, Cert72
Device IDs: Sw71a, Sw71b
Users = Ingrid

404

Group: PCB
Group ID: Grp-PCB
Domain Certs: Cert91
Device IDs: Sw91a, Sw91b
Users = Ken

404

Group: Firmware Development
Group ID: Grp-FWD
Domain Certs: Cert31
Device IDs: Sw31a, Sw31b, Sw31c
Users = Henry

404

Group: Mechanical
Group ID: Grp-Mech
Domain Certs: Cert81, Cert82
Device IDs: Sw81a
Users = Janice, Henry

APPLICATION PROGRAMMING INTERFACE FOR ACCESS TO OWNERSHIP VOUCHERS

BACKGROUND

The present disclosure relates to Request for Comments (RFC) 8366-compliant ownership vouchers in the context of managing network devices in a network deployment. Briefly, when a network device (e.g., switch, router, etc.) boots up and detects that it is not configured, the network device can send a Dynamic Host Configuration Protocol (DHCP) request to the customer's DHCP server. The DHCP response can include an ownership voucher that the network device can then use to configure itself with.

Generally, the ownership voucher is a document that is digitally signed by the vendor of the network device. The ownership voucher typically contains information to bootstrap the network device such as the Internet Protocol (IP) address of a bootstrap server, a pinned domain certificate, etc. The "bootstrapping" process includes accessing and applying configuration to the network device.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 4 illustrates an example of an organization tree in accordance with some embodiments.

DETAILED DESCRIPTION

The present disclosure provides an application programming interface (API) that allows users in an organization to request ownership vouchers for network devices, such as switches, routers, and the like that are owned by the organization. The API provides access to functionality to manage users and devices within the organization, in addition to accessing ownership vouchers for devices.

In accordance with the present disclosure, the API can include functionality for the user to define an organization tree that represents the user's organization. In some instances, the organization tree can include external associations such as third party providers and the like. The organization tree is defined by a root node (which represents the organization itself) and children nodes (which represent the hierarchy of groups/departments in the organization). Users and devices can be assigned to groups within the organization. The API can include functionality to request ownership vouchers within the organization in the context of the organization tree. Permission to access an ownership voucher for a device depends at least on where the device and the requester of the ownership voucher are in the organization tree.

In accordance with the present disclosure, the API can include functionality to manage the organization, including add/delete groups, add/delete users, and add/delete devices, move users and devices among groups, and so on. The API can include functionality to manage and access ownership vouchers, including create/delete ownership vouchers and request ownership vouchers.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
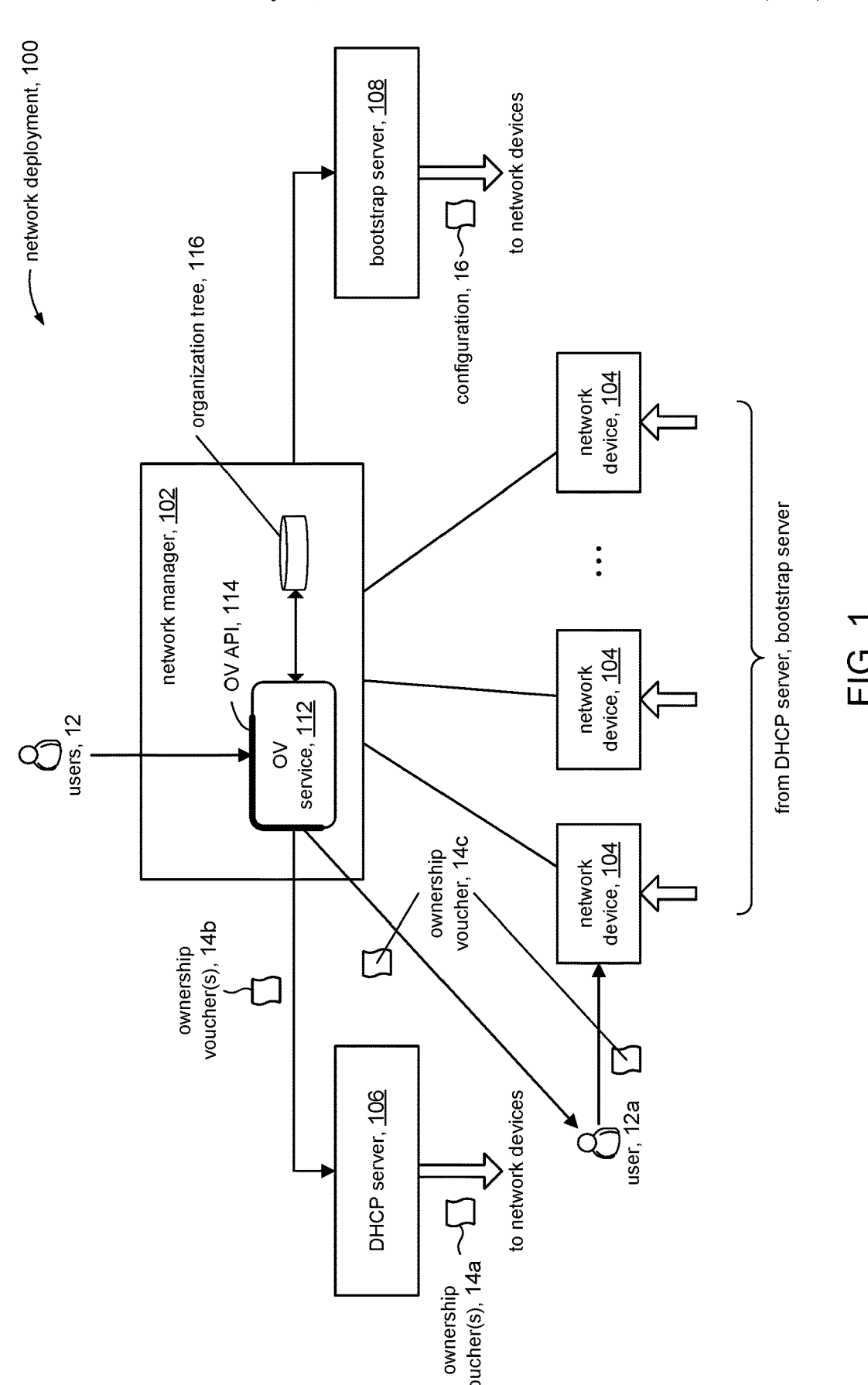
FIG. 1 illustrates an example of a network deployment in accordance with some embodiments.

FIG. 1 is a high level block diagram illustrating a network deployment 100 that can embody techniques in accordance with the present disclosure. In some embodiments, network deployment 100 comprises a network management system (network manager) 102 to manage/control a deployment of network devices 104; e.g., switches, routers, gateways/edge devices, etc.

The network manager 102 can be in communication with the network devices 104 to provide user(s) 12 (e.g., network management personnel) with access to network devices in the deployment, for example, to perform device configuration, conduct maintenance activities, troubleshoot network problems, retrieve metrics, etc. Network manager 102 can be any suitable management and control system to manage the deployment 100. In some embodiments, for example, the network manager can be the CloudVision® network management platform developed and sold/licensed by Arista Networks, Inc. of Santa Clara, California.

Network deployment 100 can include a DHCP server 106 and a bootstrap server 108 to support zero-touch provisioning (ZTP) of network devices 104. With zero-touch provisioning, the network device can self-configure after the device has been installed; the person doing the physical installation does not need to configure the device. Following is an example bootup sequence to illustrate the role of the DHCP server 106 and the bootstrap server 108 in a typical bootup sequence:

A network device is installed and powered up.

Upon power up, the network device can determine that it has no configuration; for example, the device is in the factory-default state and has no packet forwarding information.

The network device can send a DHCP request to the DHCP server 106 to obtain an IP address for itself. The DHCP server can also include an RFC-8366 ownership voucher 14a in its response to the request, in addition to an IP address. The ownership voucher includes the IP address of a bootstrap server (e.g., bootstrap server 108) that contains configuration information 16 to bootstrap (configure) the network device.

The network device can access the configuration information 16 from the bootstrap server 108 and configure itself with the accessed configuration information.

Figure 2:
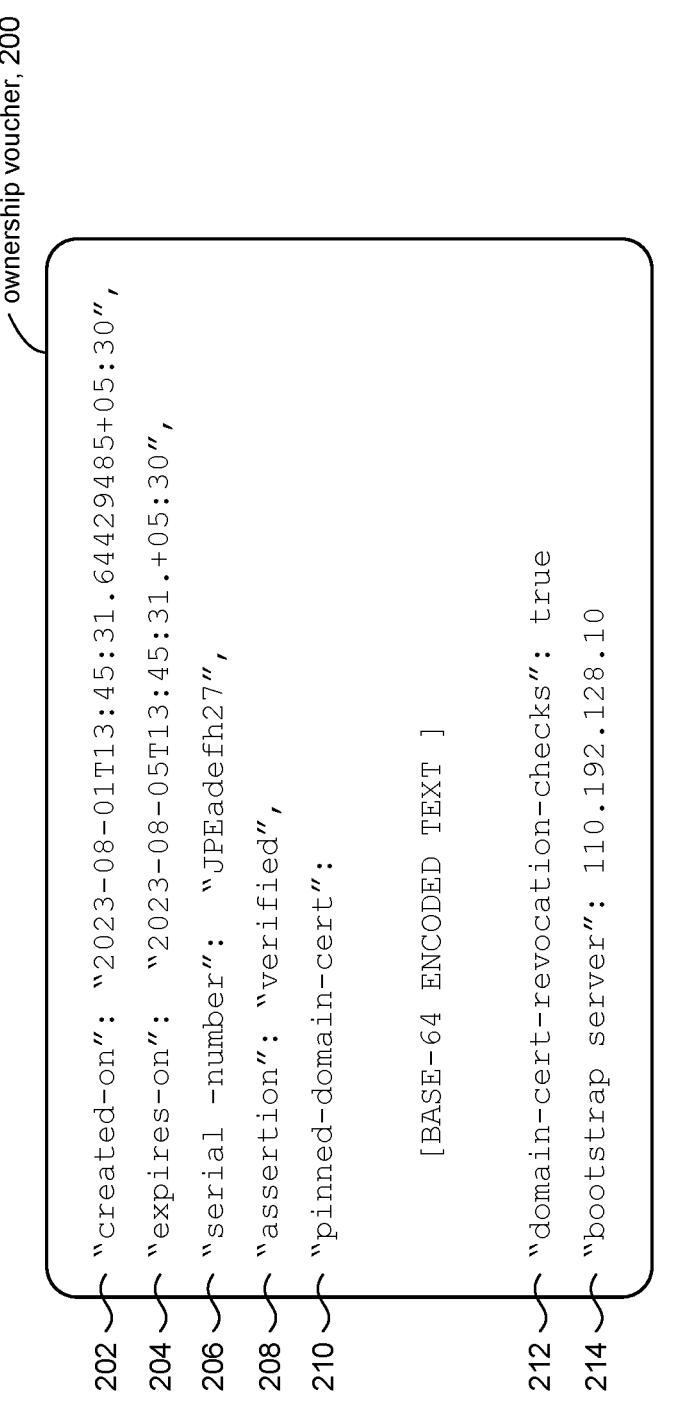
FIG. 2 is an example of an ownership voucher.

An RFC 8366-compliant ownership voucher can be used with zero-touch provisioning to ensure that the network device is securely configured. RFCs are formal documents from the Internet Engineering Task Force that contain specifications about topics related to the Internet and computer networking. RFC 8366 defines an object called an ownership voucher to securely provision a network device when it boots up in a factory-default state; e.g., when the device is installed and booted up for the first time, when the device is reset to the factory-default state, etc. Referring for a moment to the illustrative example shown in FIG. 2, in some embodiments, the ownership voucher 200 can be a JavaScript Object Notation (JSON) document that is signed by the vendor of the network device. In some embodiments, the ownership voucher 200 can comprise data fields such as:

created-on (202), expires-on (204)—these dates follow RFC 3339 format serial number (206)—this is the serial number or other identifier of the network device to which the ownership voucher is associated assertion (208)—this indicates how the ownership voucher was allowed to be issued pinned domain certificate (210)—this is a x509 certificate, encoded per Abstract Syntax Notation One, Distinguished Encoding Rules (ASN.1 DER), that is converted into a string using base64 encoding. This is the x509-based root of trust to use when validating the identity of the server that the device processing the ownership voucher is communicating with.

domain-cert-revocation-checks (212)—this is a boolean value bootstrap server (214)—this is the IP address of the bootstrap server that contains the configuration information In accordance with the present disclosure, ownership vouchers can be managed by an ownership voucher (OV) service 112. In some embodiments, OV service 112 can be incorporated as one service among many services provided by network manager 102. It will be appreciated, however, that in other embodiments, OV service 112 can be implemented in a computing device (not shown) separate from the network manager 102.

Services provided by OV service 112 can be made available to users 12 via a suitable API 114. API 114 can be used to implement a command line interface (CLI) for human users 12. Likewise, API 114 can be used to implement machine interfaces for computer "users" such as DHCP server 106. In some embodiments, API 112 can be based on a remote procedure call (RPC) framework developed by Google LLC, which is now in the public domain and known as the gRPC communication protocol. It will be appreciated that the API can be based on any suitable technology, such as for instance, Representational State Transfer (REST), OpenAPI, and the like.

In some embodiments, OV service 112 can manage an organization tree 116 that represents the structure of an organization in terms of a hierarchy of groups, departments, etc. in the organization. The organization tree 116 shows the relationship between devices in the organization and users who manage those devices. In accordance with the present disclosure, OV service 112 can manage access to and distribution of ownership vouchers in the context of the organization tree 116. These aspects of the present disclosure are discussed in more detail below.

FIG. 1 shows that in various embodiments, the OV service 112 can provide (push) ownership vouchers 14b to DHCP server 106. DHCP server 106 can then provide ownership vouchers to network devices as described above. In some embodiments, OV service 112 can provide ownership vouchers 14c directly to a user 12a. In some embodiments for example, user 12a may want to provide the ownership voucher 14c locally to a network device, rather than via DHCP server 106, as part of a maintenance operation, a troubleshooting session, and so on.

Figure 3:
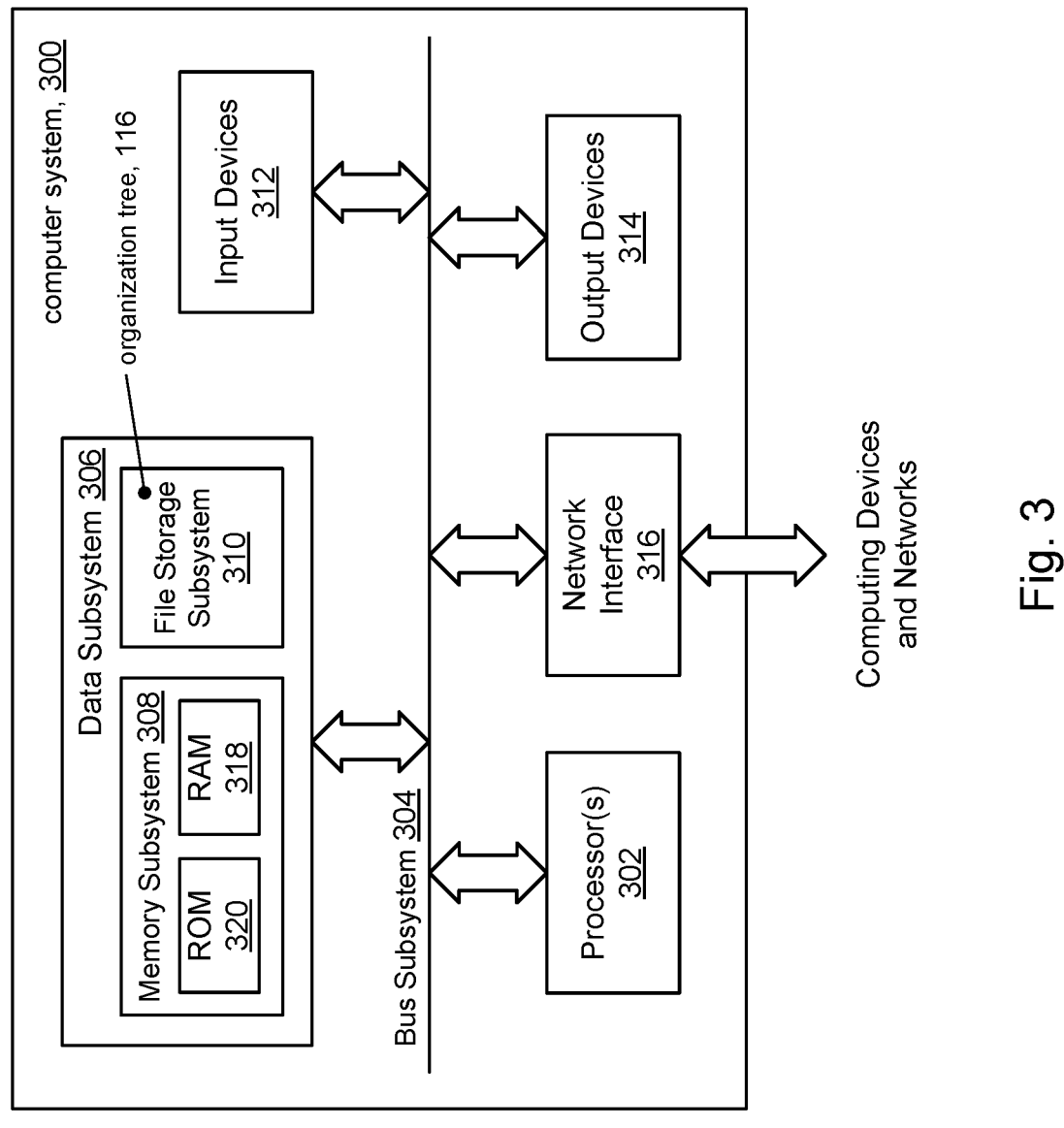
FIG. 3 is an example of a computing device in accordance with some embodiments.

FIG. 3 depicts a simplified block diagram of an example computer system (device) 300 according to certain embodiments. Computer system 300, for example, can be used to implement network manager 102 shown in FIG. 1. As noted above, in some embodiments, computer system 300 can be used to implement a standalone OV service that operates separately from the network manager.

As shown in FIG. 3, computer system 300 includes one or more processors 302 that communicate with a number of peripheral devices via bus subsystem 304. These peripheral devices include data subsystem 306 (comprising memory subsystem 308 and file storage subsystem 310), user interface input devices 312, user interface output devices 314, and network interface subsystem 316.

Bus subsystem 304 can provide a mechanism that enables the various components and subsystems of computer system 300 to communicate with each other as intended. Although bus subsystem 304 is shown schematically as a single bus, alternative embodiments of the bus subsystem can utilize multiple busses.

Network interface subsystem 316 can serve as an interface for communicating data between computer system 300 and other devices; e.g., network devices, client computing devices for remote access, etc. Embodiments of network interface subsystem 316 can include, e.g., an Ethernet card, a Wi-Fi and/or cellular adapter, and/or the like. Local access to computer system 300 can be provided via input devices 312 (e.g., keyboard, pointing devices, etc.) and output devices 314 (e.g., a computer monitor, etc.).

Data subsystem 306 includes memory subsystem 308 and file/disk storage subsystem 310 represent non-transitory computer-readable storage media that can store program code and/or data, which when executed by processor 302, can cause processor 302 to perform operations in accordance with embodiments of the present disclosure (e.g., services provided by OV service 112).

Memory subsystem 308 includes a number of memories including main random access memory (RAM) 318 for storage of instructions and data during program execution and read-only memory (ROM) 320 in which fixed instructions are stored. File storage subsystem 310 can provide persistent (i.e., non-volatile) storage for program and data files (e.g., organization tree 116), and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 300 is illustrative and many other configurations having more or fewer components than system 300 are possible.

FIG. 4 shows an illustrative example of an organization tree for an organization and groups (entities) within the organization. FIG. 4 shows an organization tree 400 for a hypothetical organization called Acme Co. and hypothetical groups (entities) within Acme Co. The organization tree 400 represents the groups and relationships between the groups that constitute the organization. More particularly, in accordance with the present disclosure, the nodes 402, 404 in organization tree 400 represent "groups" in the context of managing or otherwise administering ownership vouchers for network devices in the organization. In accordance with some embodiments, groups can be used to limit the scope of available data and allow for the members of the group to manage ownership vouchers for a subset of network devices. A group can correspond to a building, offices, or some geographical location. Ownership vouchers for that group can be managed by network support personnel.

In some embodiments, the nodes can contain the following information:

group—This is the name of the group.

group ID—This is an internal identifier for the group.

domain cert ID—This is the certification ID of a pinned domain certification (PDC), which represents the root of trust used in the ownership voucher, along with "revocation checks" and "expiry time." When a pinned domain cert is added to a group, its certificate ID is returned. While creating ownership vouchers, the cert ID is used to reference the PDC.

device serial—This is the part number, serial number, etc. to uniquely identify a network device. An ownership voucher can be issued based on the device serial.

users—These are the users in a given group.

It will be appreciated that in a particular deployment, the nodes can include additional information.

Root node 402 represents the organization itself. The children nodes descend from the root node, and are linked according to their relationship to each other within the organization. As shown in FIG. 4, for example, the Acme Co. organization is divided into two major groups: Engineering and HR. The organization tree 400 shows that the Engineering group has two sub-groups: Firmware Development and Hardware Development. The Hardware Development group is further divided into two sub-groups Mechanical and PCB. The HR group and the Firmware Development group are not divided into sub-groups.

The organization tree 400 represents a hierarchy of groups. Children nodes 404 descend from a parent node. For example, the nodes 404 corresponding to the Engineering and HR groups descend from the root (parent) node 402. The children nodes, in turn, have descendants. For example, the descendants of the Engineering node include the Firmware Development node, the Hardware Development node, and the nodes that descend from the Hardware Development node, namely the Mechanical node and the PCB node.

As noted above, the organization tree is defined in the context of managing devices in the organization. Each child node 404 is associated with one or more users (e.g., network support personnel) and one or more network devices. In other words, the node for a group indicates the devices (switches, routers) in that group, and the user(s) who have access to manage the devices and the ownership vouchers for those devices in that group. For example, users Charles, David, and Ellen in the Engineering group can manage ownership vouchers for network devices identified as Sw11a, Sw11b. User Ingrid in The Hardware Development group can manage ownership vouchers for network devices identified as Sw71a, Sw71b, and so on.

In accordance with some embodiments, a user additionally has access to manage ownership vouchers in groups that descend from the node that the user is associated with. For example, user Ingrid who is associated with the Hardware Development group can also manage ownership vouchers for device Sw81a in the Mechanical group and devices Sw91a, Sw91b in the PCB group. Users Alice and Betty in the root node can manage ownership vouchers for all the devices in the organization. On the other hand, users Frank and Greg who are associated with the Hardware Development group can only manage ownership vouchers for device Sw21a.

Conversely, a user does not have access to manage ownership vouchers for devices in ancestor nodes of the user's node. For example, Ingrid who is associated with the Hardware development group does not have access to manage ownership vouchers for devices Sw11a, Sw11b in the Engineering group. Likewise, user Ken in the PCB group does not have access to manage ownership vouchers for devices Sw71a, Sw71b in the Hardware Development group or devices Sw11a, Sw11b, Sw11c in the Engineering group.

In accordance with some embodiments, a user can belong to multiple groups. For example, user Henry is associated with both the node for the Firmware Development group and the node for the Mechanical group. User Henry's access to manage ownership vouchers is still restricted based on the node(s) to which Henry is associated. For example, Henry can manage ownership vouchers for only devices Sw31a, Sw31b, and Sw31c in the Firmware Development group and only devices Sw81a, Sw81b in the Mechanical group.

Figure 5:
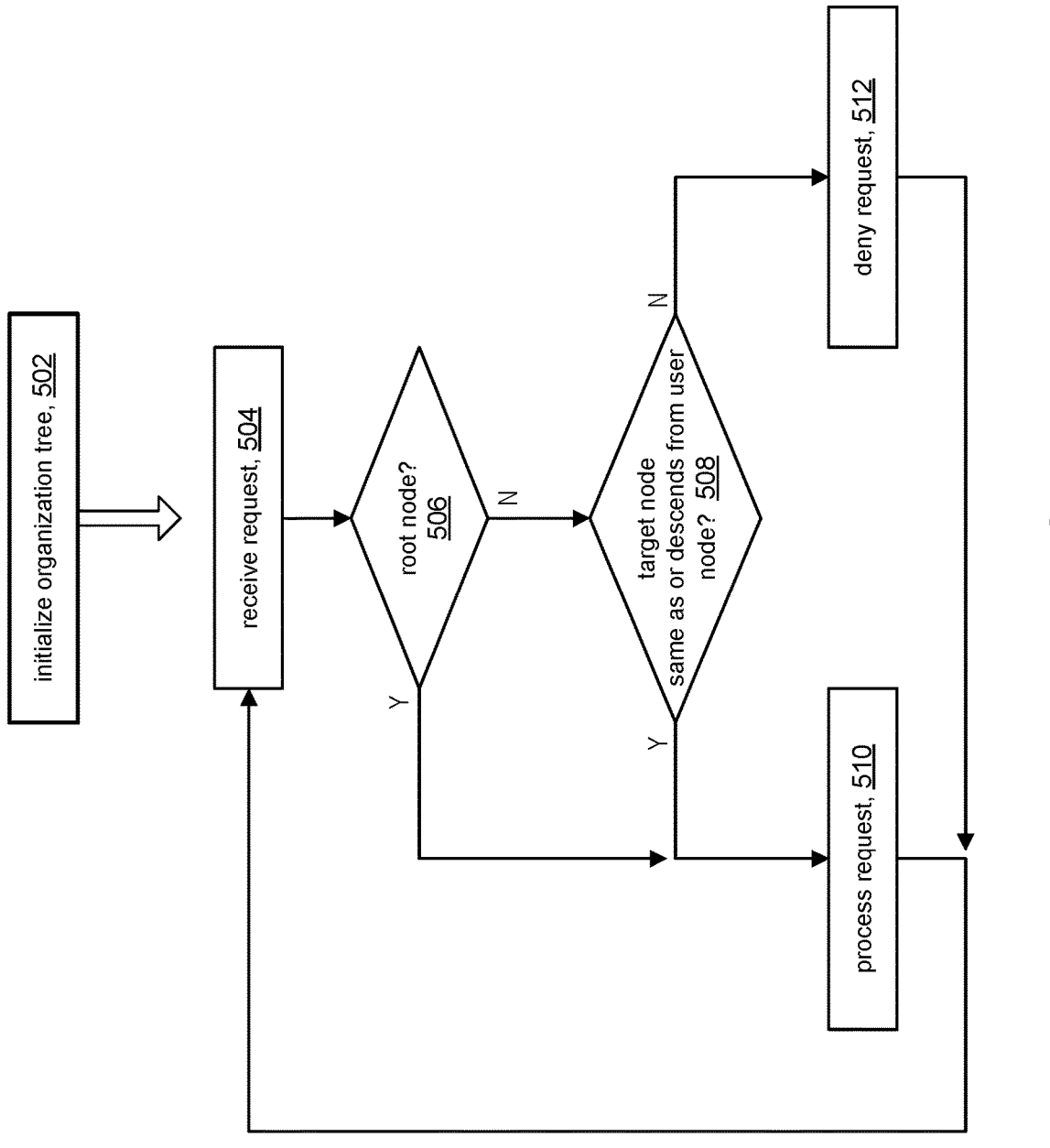
FIG. 5 represents a flow of operations in the ownership voucher service in accordance with some embodiments.

Referring to FIG. 5, the discussion will now turn to a high-level description of processing by the OV service 112 (FIG. 1) to service requests for managing ownership vouchers in accordance with the present disclosure. In some embodiments, for example, the OV service 112 can include computer executable program code (e.g., stored on a non-transitory computer-readable storage memory device), which when executed by a processor (e.g., 302, FIG. 3), causes the computer system to perform the processing in accordance with FIG. 3. The operation and processing blocks described below are not necessarily executed in the order shown. Operations can be combined or broken out into smaller operations in various embodiments. Operations can be allocated for execution among one or more concurrently executing processes and/or threads.

At operation 502, the OV service can initialize the organization tree (e.g. FIG. 4). In some embodiments, the organization tree can be created by the vendor; e.g., a provider of the network management system 102. The initial organization tree can comprise only a root node that is initialized by the vendor with details of the organization such as the name of the organization, an initial list of device IDs (e.g., serial numbers) of the network devices owned by the organization, one or more root users, etc. A root user has authority to manage the organization's entire network deployment.

When the organization tree is initialized, the OV service can receive service requests. The OV service can include a suitable API to provide users (human users and machine users) with access to services supported by the OV service. Additional details of request handling will now be described.

At operation 504, the OV service can receive a service request to manage ownership vouchers in accordance with the present disclosure. The management of ownership vouchers includes managing the organization tree itself, including adding/deleting groups, users, and network devices, generating information relating to an ownership voucher, managing the ownership voucher itself, and so on. Elements (e.g., users, devices) can be moved about in the organization tree by combinations of delete and add operations. Additional details of specific requests are discussed below.

At decision point 506, if the request comes from a root user (i.e., the user is associated with the root node of the organization), then processing can proceed immediately to operation 510 to process the request (i.e., no validation of the root user is needed). If the request does not come from a root user, then processing can proceed to decision point 508 to validate the user (requester) of the request.

At decision point 508, if the node that is the target of the request (target node) descends from (is a descendent of) the node to which the user is associated (user node), then processing can proceed to operation 510 to process the request. Otherwise, the processing can proceed to operation 512 to deny the request. As noted above in connection with FIG. 4, the organization tree represents a hierarchical relation between the groups in the organization. A user has access to manage ownership vouchers for devices within the user's group. A user also has access to manage ownership vouchers for devices in nodes (groups) that descend from the user's node. In accordance with the present disclosure, a user does not have access to manage ownership vouchers for devices in nodes that are higher in the organization tree than the node to which the user is associated, including nodes that are ancestors to the user node.

At operation 510, the OV service can process the requested service (some examples are discussed below). Processing can return to operation 504 to receive another request.

At operation 512, the OV service can deny the request, or otherwise respond with an error message, when the user does not have access to perform the request. In some embodiments, the OV service can log an error to record the denied attempt, for example, for security purposes. Processing can return to operation 504 to receive another request.

The discussion will now turn to a description of illustrative examples of services that can be requested to manage ownership vouchers in accordance with the present disclosure. The services can be accessed via API 114 of OV service 112 shown in FIG. 1:

CREATEGROUP
    function-creates a named group as a child node from an existing child node, or from the root node
    inputs
        parent node, e.g., referenced by an identifier of the group associated with the node
        group name of the node being created
        users who manage ownership vouchers for the group
    output—group ID associated with the node
GETGROUP
    function—view details of a group of interest and its sub-groups (children nodes)
    input—group ID of the group of interest
    outputs
        the group name of the group of interest
        group ID of the group of interest
        list of IDs of domain cert(s) of the group of interest
        list of device serials of the devices associated with the group of interest
        list of users associated with the group of interest, where users refer to personnel who manage ownership vouchers for the group
        list of group IDs of the sub-groups (children nodes) of the group of interest
DELETEGROUP
    function—deletes a group of interest
    input—group ID of the group of interest
    outputs
        no error on successful delete
        returns error if the group of interest has sub-groups (children nodes)
        returns error if the group of interest has any objects associated with it ADDUSER
    function—adds a user to a group of interest; the user is someone who is allowed to manage ownership vouchers for the group of interest
    input
        username of the user to be added
        group ID of the group of interest
    output—none
REMOVEUSER
    function—removes a user from a group of interest
    input
        username of the user to be removed
        group ID of the group of interest
    output—none
GETUSER
    function—returns a list of groups to which a user of interest belongs
    input—username of the user of interest
    output—a list of groups to which the user of interest belongs
CREATEDOMAINCERT
    function—creates a pinned domain certificate (PDC) for a group of interest
    inputs
        group ID of the group of interest
        an ASN.1 DER encoded x509 certificate (the domain cert)
        revocation_checks-set to TRUE
        expiration time
    output–ID (cert ID) of the generated pinned domain certificate
GETDOMAINCERT
    function—obtain information associated with a PDC of interest
    input—cert ID of the PDC of interest
    outputs
        group ID of the group to which the PDC of interest belongs
        an ASN.1 DER encoded x509 certificate
        revocation_checks
        expiration time of the PDC
DELETEDOMAINCERT
    function—deletes a PDC of interest
    input—cert ID of the PDC of interest
    output—none
ADDDEVICE
    function—add a device of interest (e.g., switch, router, etc.) to a group of interest; the device becomes associated with the group
    inputs
        group ID of the group of interest
        identifier (e.g., serial number) of the device of interest to be added (device serial)
    output—none
REMOVEDEVICE
    function—delete a device of interest from a group of interest
    inputs
        device serial of the device of interest
        group ID of the group of interest
    output—none
GETDEVICE
    function—return information about a device of interest
    inputs—device serial of the device of interest
    output—information about the device of interest such as
        an ASN.1 DER encoded Trusted Platform Module (TPM) public key the group ID of the group to which the device of interest is assigned MAC address of the device of interest

GETOWNERSHIPVOUCHER function—generate an ownership voucher for a device of interest inputs device serial of the device of interest cert ID of the PDC associated with the group a lifetime of the ownership voucher output the ownership voucher, signed and provided in Cryptographic Message Syntax (CMS) format the ASN.1 DER encoded TPM public key In some embodiments, processing of the GETOWNERSHIPVOUCHER service includes verifications such as:

the device and the domain certificate belong to the same group (node) in the organization tree the user making the request (requester) is in the same node as that of the device and the domain certificate, or that the user's node is an ancestor node of the node as the device.

the lifetime of the ownership voucher does not exceed the expiration time of the domain certificate The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A computing device in an organization, the computing device comprising:

one or more computer processors;

a data store having stored therein an organization tree that represents the organization, the organization tree comprising a plurality of nodes, wherein each node corresponds to a group in the organization, wherein each node is associated with one or more users of the organization and one or more devices of the organization; and a computer-readable storage device comprising instructions for controlling the one or more computer processors to:

receive requests to modify nodes in the organization tree;

modify the organization tree in response to the received requests, including processing the received requests to add information to and/or to delete information from one or more nodes in the organization tree;

receive a get request from a user to obtain an ownership voucher for a target device, wherein the user is associated with a node ("user node") in the organization tree and the target device is associated with a node ("device node") in the organization tree; and respond to the get request, including either generating the ownership voucher for the target device or generating an error response depending on the relative locations of the user node and the device node in the organization tree.

2. The computing device of claim 1, wherein:

the ownership voucher is generated when either (1) the user node and the device node are the same node in the organization tree or (2) the device node is a descendant node of the user node, and the error response is generated when both (1) the user node and the device node are different nodes in the organization tree and (2) the device node is not a descendant node of the user node.

3. The computing device of claim 1, wherein the ownership voucher is used to install the target device.

4. The computing device of claim 1, wherein the device node is associated with a domain certificate, wherein generating the ownership voucher for the target device includes verifying that an ownership voucher lifetime specified in the get request does not exceed an expiration time of the domain certificate.

5. The computing device of claim 1, wherein modifying the organization tree in response to the received requests further includes, for each received request:

processing the received request when a node associated with a requester of the received request is (1) the same node as a node targeted by the received request or (2) an ancestor node of the target node; and generating an error response when the node associated with the requester of the received request is neither (1) the same node as the target node nor (2) an ancestor node of the target node.

6. The computing device of claim 1, wherein the received requests include:

an add group request to add a node to the organization tree that corresponds to a group specified in the add group request; and a delete group request to delete a node to the organization tree that corresponds to a group specified in the delete group request.

7. The computing device of claim 1, wherein the received requests include:

user-related requests to add users to nodes in the organization tree and to delete users from nodes in the organization tree;

device-related requests to add devices to nodes in the organization tree and to delete devices from nodes in the organization tree; and certificate-related requests to add domain certificates to nodes in the organization tree and to delete domain certificates from nodes in the organization tree.

8. A non-transitory computer-readable storage device in having stored thereon computer executable instructions, which when executed by a computer device, cause the computer device to:

receive requests to modify nodes in an organization tree that represents an organization, wherein each node corresponds to a group in the organization, wherein each node is associated with one or more users of the organization and one or more devices of the organization;

modify the organization tree in response to the received requests, including processing the received requests to add information to and/or to delete information from one or more nodes in the organization tree;

receive a get request from a user to obtain an ownership voucher for a target device, wherein the user is associated with a node ("user node") in the organization tree and the target device is associated with a node ("device node") in the organization tree; and respond to the get request, including either generating the ownership voucher for the target device or generating an error response depending on the relative locations of the user node and the device node in the organization tree.

9. The non-transitory computer-readable storage device of claim 8, wherein the ownership voucher is generated when either (1) the user node and the device node are the same node in the organization tree or (2) the device node is a descendant node of the user node, and wherein the error response is generated when both (1) the user node and the device node are different nodes in the organization tree and (2) the device node is not a descendant node of the user node.

10. The non-transitory computer-readable storage device of claim 8, wherein the ownership voucher is used to install the target device.

11. The non-transitory computer-readable storage device of claim 8, wherein modifying the organization tree in response to the received requests further includes, for each received request:

processing the received request when a node associated with a requester of the received request is (1) the same node as a node targeted by the received request or (2) an ancestor node of the target node; and generating an error response when the node associated with the requester of the received request is neither (1) the same node as the target node nor (2) an ancestor node of the target node.

12. The computing device of claim 1, wherein the ownership voucher is based on Request For Comment (RFC) 8366.

13. The non-transitory computer-readable storage device of claim 8, wherein the device node is associated with a domain certificate, wherein generating the ownership voucher for the target device includes verifying that an ownership voucher lifetime specified in the get request does not exceed an expiration time of the domain certificate.

14. The non-transitory computer-readable storage device of claim 8, wherein the ownership voucher is based on Request For Comment (RFC) 8366.

15. The non-transitory computer-readable storage device of claim 8, wherein the received requests include:

an add group request to add a node to the organization tree that corresponds to a group specified in the add group request; and a delete group request to delete a node to the organization tree that corresponds to a group specified in the delete group request.

16. The non-transitory computer-readable storage device of claim 8, wherein the received requests include:

an add user request to add a user to a node in the organization tree; and a delete user request to delete a user from a node in the organization tree.

17. The non-transitory computer-readable storage device of claim 8, wherein the received requests include:

an add device request to add a device to a node in the organization tree; and a delete device request to delete a device from a node in the organization tree.

18. The non-transitory computer-readable storage device of claim 8, wherein the received requests include:

an add certificate request to add a domain certificate to a node in the organization tree; and a delete certificate request to delete a domain certificate from a node in the organization tree.

\* \* \* \* \*